Patented Feb. 23, 1954

2,669,767

UNITED STATES PATENT OFFICE 2,669,767

SELENIUM RECTIFIER

Benjamin P. Hecht, Dorchester, and Fred Koury, Somerville, Mass., assignors to Sylvania Electric Products Inc., Salem, Mass., a corporation of Massachusetts No Drawing. Application December 30, 1947, Serial No. 794,794

12 Claims. (Cl. 29—25.3)

This invention relates to so-called metal rectifiers, and particularly to selenium rectifiers.

Such rectifiers have comprised a metal plate or electrode, generally, but not necessarily, of etched and nickel-plated aluminum, on which a layer of vitreous selenium is pressed and afterward converted to a layer of crystalline selenium by heat treatment. A counterelectrode may then be applied to the side of the selenium layer away from the aluminum plate.

We find that treatment of the crystallium selenium layer with ozone before applying the counterelectrode greatly improves the rectifying action of the device, and the uniformity with which they can be made in large-scale production.

Various methods of treatment of the selenium surface before applying the counterelectrode have been known to increase the back resistance of the device, but they have increased the front resistance as well, which is undesirable. Our method increases the back resistance with very little change in front resistance and thus greatly improves the rectifying efficiency. The front resistance is, of course, the resistance in the direction in which current is to be passed; the back resistance is the resistance in the direction in which current is to be suppressed.

Other objects, features and advantages of the invention will be apparent from the following specification.

In following our invention we make a selenium coated metal surface in a manner well-known in the art, for example by chemically etching an aluminum plate with acid and/or alkalis, and then plating it with nickel. Ground vitreous selenium may then be sprinkled on the nickel surface, and heat-pressed to form a selenium layer in the usual manner. This layer is then converted to a crystalline selenium layer by heating, for example to a temperature of about 215° C.

In accordance with our invention we then expose the crystalline selenium surface to ozone in a concentration of for example, 3 milligrams of ozone per cubic foot of oxygen. We prefer to produce the ozone by flowing oxygen through a chamber containing a source of ozonizing radiation, say short wave length ultraviolet light, and running the selenium-coated plates through the chamber on a conveyor belt, although other methods may be used. With the ozone concentration specified, about a minute and a half is sufficient exposure of the selenium to ozone, but if higher or lower concentrations are used the time should be, respectively, shorter or longer for best results.

After being ozonized, the plates are preferably allowed to stand in air, for example, room air, for about half an hour, as this seems to give a further improvement in the rectification. The counterelectrode may then be applied in the usual manner, for example by spraying metal over the ozonized selenium surface, being careful of course not to short circuit the selenium layer. The rectifier element may then be electroformed in the manner common in the art; for example by being subjected to a voltage in the least current carrying direction.

What we claim is:

1. The method of preparing a selenium rectifier element comprising coating a metal plate with a vitreous layer of selenium, subjecting the coated plate to a temperature sufficient to crystallize the selenium layer, and then exposing the crystallized layer to nascent ozone approximately equivalent to 3 milligrams per cubic foot for 1½ minutes.

2. The method of treating a rectifier blank having a layer of crystalline selenium on a metal electrode, comprising exposing the crystalline selenium layer to nascent ozone for a time and in an ozone concentration approximately equivalent to 1½ minutes at 3 milligrams per cubic foot, and applying a counterelectrode.

3. The method of making a selenium rectifier element comprising forming a layer of crystalline selenium on a metal plate, exposing the layer to locally produced ozone for a period limited to produce a thin film, allowing the coated and exposed plate to stand for about half an hour, and then applying a counterelectrode to the selenium.

4. The method of making a selenium rectifier element comprising forming a layer of crystallized selenium on a metal electrode, and exposing the crystalline selenium layer to nascent ozone in a concentration of 3 mg./cu. ft. for approximately 1½ minutes.

5. The method of preparing a selenium rectifying surface, which comprises forming a layer of crystalline selenium and exposing it to nascent ozone in a concentration and for a length of time approximately equivalent to 3 milligrams per cubic foot for 1½ minutes.

6. The method of preparing a selenium asymmetrically conductive layer, which comprises forming a layer of crystalline selenium and exposing it to nascent ozone in a concentration of approximately 3 milligrams per cubic foot for approximately 1½ minutes, or to other concentration of ozone for an inversely adjusted period of time.

7. In the manufacture of asymmetric conductors having a crystallized layer of selenium on a carrier electrode, that surface treatment which comprises exposing the selenium layer to freshly ozonized oxygen in a concentration and for a time approximately equivalent to 3 cubic feet per minute for 1½ minutes.

8. The method of making a selenium rectifier element having a layer of selenium on a carrier electrode and a counterelectrode on the selenium surface opposite the carrier electrode, which method comprises the steps of exposing the selenium surface before application of the counterelectrode to the action of freshly ozonized oxygen only long enough to effect limited surface reaction, and then exposing the ozonated surface to prolonged exposure to air.

9. The method of making a selenium rectifier element which includes the following steps: forming a layer of crystalline selenium on a metal plate, exposing the selenium layer to freshly ozonized oxygen in concentration and for a period of time approximately equivalent to three cubic feet per minute for one and one-half minutes, allowing the plate to stand exposed for about half an hour and then applying a counterelectrode to the exposed selenium surface.

10. The method of enhancing the electrical properties of selenium that comprises converting selenium to the grey crystalline form, creating nascent ozone, and directing said ozone onto said selenium.

11. The method of enhancing the ability of selenium to resist current flow in one direction without appreciably increasing its resistance to current flow in the other direction that comprises creating nascent ozone and directing said ozone onto said selenium.

12. The method of enhancing the electrical properties of selenium that comprises converting selenium to the crystalline form, creating nascent ozone, and directing said ozone onto said selenium.

BENJAMIN P. HECHT.
FRED KOURY.

References Cited in the file of this patent

UNITED STATES PATENTS

| Number | Name | Date |
|---|---|---|
| 2,349,622 | Hewlett | May 23, 1944 |
| 2,361,969 | Saslaw | Nov. 7, 1944 |
| 2,418,055 | Smith | Mar. 25, 1947 |